United States Patent
Geinitz et al.

(10) Patent No.: US 8,342,476 B2
(45) Date of Patent: Jan. 1, 2013

(54) STIRRER STAND

(75) Inventors: Juergen Geinitz, Halle (DE); Thomas Pensler, Langenbogen (DE); Thomas Koch, Lindhorst (DE)

(73) Assignee: KSB Aktiengesellschaft, Frankenthal (DE)

( * ) Notice: Subject to any disclaimer, the term of this patent is extended or adjusted under 35 U.S.C. 154(b) by 0 days.

(21) Appl. No.: 13/078,534

(22) Filed: Apr. 1, 2011

(65) Prior Publication Data

US 2011/0198476 A1 Aug. 18, 2011

Related U.S. Application Data (63) Continuation of application No. PCT/EP2009/007013, filed on Sep. 30, 2009.

(30) Foreign Application Priority Data

Oct. 4, 2008 (DE) .......................... 10 2008 050 136

(51) Int. Cl.
- F16M 13/00 (2006.01)
- A47B 96/06 (2006.01)
- A47G 29/00 (2006.01)
- A47K 1/00 (2006.01)
- E04G 3/00 (2006.01)

(52) U.S. Cl. ........ 248/626; 248/669; 248/671; 248/676; 248/219.4; 248/218.4; 248/638; 248/688; 248/519; 248/117.2; 248/227.3; 248/507; 248/219.2; 366/242

(58) Field of Classification Search .................. 248/636, 248/669, 671, 676, 219.4, 218.4, 638, 688, 248/519, 117.2, 227.3, 507, 219.2, 291.3; 366/242

See application file for complete search history.

(56) References Cited

U.S. PATENT DOCUMENTS

| | | | | |
|---|---|---|---|---|
| 2,290,410 | A * | 7/1942 | Dawson ..................... | 248/125.3 |
| 4,105,176 | A * | 8/1978 | Hill et al. ...................... | 248/676 |
| 4,326,694 | A * | 4/1982 | Destree ......................... | 248/676 |
| 4,464,259 | A * | 8/1984 | Cramer et al. ................ | 210/219 |
| 4,581,182 | A * | 4/1986 | Cramer et al. ................. | 261/93 |
| 4,671,872 | A * | 6/1987 | Cramer et al. ................ | 210/219 |
| 4,840,267 | A * | 6/1989 | Pine ............................. | 198/498 |
| 7,341,230 | B2 * | 3/2008 | Beaudry .................... | 248/219.4 |
| 2003/0063757 | A1 * | 4/2003 | Repouz ........................ | 381/87 |
| 2008/0029683 | A1 * | 2/2008 | Draghici ...................... | 248/640 |
| 2009/0211936 | A1 * | 8/2009 | Korff ........................ | 206/459.5 |

FOREIGN PATENT DOCUMENTS

| | | |
|---|---|---|
| DE | 39 00 630 A1 | 12/1990 |
| DE | 196 20 986 C1 | 9/1997 |
| EP | 0 980 704 A2 | 2/2000 |

OTHER PUBLICATIONS

English translation of Written Opinion of the International Searching Authority (Seven (7) pages).
International Search Report with partial English translation dated Jan. 28, 2010 and PCT/ISA/237 (eight (8) pages).

\* cited by examiner

*Primary Examiner* — Terrell McKinnon
*Assistant Examiner* — Christopher Garft
(74) *Attorney, Agent, or Firm* — Crowell & Moring LLP (57) ABSTRACT

A stirrer stand (10) for a submersible motor stirrer (12) composed of at least one base part (14) and a receiving part (16) for the submersible motor stirrer beyond which a guide member extends, which is used for guiding the submersible motor during assembly, the entire stirrer stand being produced from a single vibration-damping material.

20 Claims, 7 Drawing Sheets

Fig.6 ered by the flow around the base frame is problematic. The
STIRRER STAND

CROSS REFERENCE TO RELATED APPLICATIONS

This application is a continuation of international patent application no. PCT/EP2009/007013, filed Sep. 30, 2009, designating the United States of America and published in German on Apr. 8, 2010 as WO 2010/037530, the entire disclosure of which is incorporated herein by reference. Priority is claimed based on Federal Republic of Germany patent application no. DE 10 2008 050 136.0, filed Oct. 4, 2008, which likewise is incorporated herein by reference.

BACKGROUND OF THE INVENTION

The present invention relates to a stirrer stand for a submersible motor stirrer.

Submersible motor stirrers are stirrers which are used together with the drive under water. They are usually employed in water treatment plants, in wastewater purification and wastewater treatment for different process-engineering stirring functions within various fields of use. The stirrer stand serves to position the stirrer in such a way in a liquid-filled basin, a corresponding plant or the like that a defined distance is maintained between the bottom of the basin and the tip of the stirring member, on the one hand, and the tip of the stirring member and the liquid level, on the other hand, which distance assures the best possible working of the stirrer.

The function of the stirrer is basically to provide good flow guidance in the respective basin or the plant in order to achieve the respective process-engineering function, for example good intermixing of several phases. The stirrer stand must absorb all forces and moments which, on the one hand, arise from the work of the stirrer itself and, on the other hand, stem from the liquid in motion in the basin or in the flow channel and from the further phases, such as gases and liquids, which may be contained therein. The absorbed forces and moments must be relayed to the subsurface, for example the bottom of the basin, or diverted into this.

Within the scope of the invention, the term stirrer stand is used. In the same way, the stirrer stand which is present here can also be used, however, as a stand for a turbine. While the stirrer has the function of generating flows, of distributing temperature and gas content, as well as microbes and further additives, e.g. for wastewater purification, and is thus used for water treatment or for other process-engineering processes, the function of a turbine is to absorb energy from a flowing stream in which it is immersed and to generate electric current.

Stirrer stands for submersible motor stirrers or turbines are already known in different embodiments.

For instance, stirrer stands constructed of steel and consisting of welded-together profiles are known. These steel constructions are usually connected to the guide member, configured as a guide tube, for the submersible motor stirrer. This enables the submersible motor stirrer, during assembly, to be transferred via the guide member into its assembly position and to be held there by the guide member, the absorbed forces being transferred via the guide member to the whole of the steel construction.

DE 39 00 630 discloses a submersible motor stirrer in which the guide tube is fixedly connected only to the bottom of the basin and in which two supports are provided for absorbing the reaction forces of the stirrer comprising a motor and a propeller, which supports are fastened, on the one hand, beneath the stirrer to the guide tube and, on the other hand, to the bottom of the basin.

In the various basins in which the submersible motor stirrers are disposed, irregular flows occur, so that the stirring member of the submersible motor stirrer is impinged upon or subjected to irregular flows. In addition, the turbulence generirregular oncoming flows lead to vibrations within the base frame, so that both the submersible motor stirrer and the base frame are subjected to above-average load.

In order to produce a mounting for a submersible motor stirrer which is as low in vibrations as possible, EP 980,704 proposes to produce the guide member, which protrudes vertically beyond the stirrer stand and which is there configured as a guide tube, from a first material, for example steel, and to produce the stirrer stand itself from a second material, for example concrete, which has different vibration characteristics than the first material. In the installed position, the submersible motor stirrer is still connected to the guide member consisting of the first material. While the stirrer stand made of concrete is now itself almost perfectly rigid, the more elastic guide member, which, even in the installed position of the submersible motor stirrer, is connected thereto, simultaneously absorbs a part of the generated forces and moments.

The previously known stirrer stands have various drawbacks, however. For instance, stirrer stands which are made entirely of high-quality steel, are very costly and, because of the lack of internal damping, are also very prone to vibration. The use of several materials, which is known from EP 980,704, additionally calls for assembly and jointing processes. The transmission of torques and forces to the guide tube, which transmission is provided according to this solution, requires the guide tube to have a solid design. This, in turn, leads to vibrations in the event of fluctuating loads.

SUMMARY OF THE INVENTION

The object of the present invention is to provide a stable stirrer stand for submersible motor stirrers which allows a mounting of the submersible motor stirrer which is as low in vibrations as possible.

This and other objects of the invention are achieved by providing a stirrer stand as described and claimed hereinafter.

Based on this solution, which provides a stirrer stand for submersible motor stirrers which at least comprises a foot part and a receiving part for the submersible motor stirrer, which receiving part, in turn, is overtopped by a guide member which serves to guide the submersible motor stirrer during assembly, with the entirely of the stirrer stand being made of a single, vibration-damping material. Within the meaning of the present invention, a vibration-damping material is a material with a low modules of elasticity. According to the present invention, the stirrer stand absorbs all the loads of the operating stirrer, or of the turbine which is correspondingly accommodated as an alternative to a stirrer. Unlike the known prior art, the guide member is not a constituent part of the stirrer stand itself and, in the working position of the stirrer, absorbs neither forces nor moments of the stirrer. It serves exclusively for the positioning of the stirrer or turbine on the stand during assembly operation, i.e. prior to use in the respective basin. Preferred embodiments of the invention are also described hereinafter.

Accordingly, the stirrer stand can advantageously be comprised of concrete, cast mineral composite, cast iron or composite materials with a low modulus of elasticity.

The contour of the receiving part is configured such that it can receive the stirrer or a turbine and can fix it in its working position. For this purpose, walls are advantageously provided, which walls absorb the reaction forces of the received submersible motor stirrer or those of the turbine. Advantageously, the submersible motor stirrer, on its side lying opposite the stirring member, can have plates, which plates bear against corresponding inner faces of the walls of the receiving part. These plates can preferably be elastic and can thus serve for the vibration damping.

Advantageously, the stirrer stand is of one-piece construction. However, it can also in principle be multi-part, in which case the possibility is afforded of composing it of a foot part and a receiving part, with an optimal intermediate part arranged therebetween. For optimal transmission of the forces and moments to the bottom of the basin, the stirrer stand is attached to the bottom of the basin in an advantageous manner by suitable fasteners. These fasteners can comprise, for example, chemical anchorages, such as adhesive dowels, reaction anchors and/or shear connectors. On the other hand, machine screws can however be provided, even in the use of steel containers. In the case of plastic containers, metallic bushings, for example, can be used, so that, here too, attachments by means of machine screws is possible. All other available and known connecting anchors can also be used, however.

The stirrer stand advantageously has a recess in which the guide member is disposed, with the guide member being fixed at one or more points in the stirrer stand by bushings disposed in the recess. These bushings advantageously are comprised of a light, elastic, pressure-resistant and vibration-damping material, preferably an appropriate plastic.

The guide member can reach to the bottom of the basin and can be fixed there in order to absorb the forces which arise during assembly of the submersible motor stirrer. A thicker dimensioning of the guide member in the region of the suspension mounting is not necessary however, since, during operation of the submersible motor stirrer, or of the turbine used in place thereof, the forces must be absorbed exclusively by the stirrer stand and not by the guide member.

The guide member can also be held by a positioning mechanism disposed on the rim of the basin. The guide member can be disposed in a recess of the stirrer stand, in which case it is plugged, glued or cast in the recess with as little play as possible.

Advantageously, the guide member is constructed as a hollow profile of angular, preferably square cross section. In principle, however, any other cross-sectional design is possible here. For instance, rectangular, triangular, pentagonal, hexagonal or even octagonal hollow profiles, or, indeed, polygonal profiles in general, having any number of corners, as well as round tubes—with or without—guide ribs, can be used. In principle, however, two or more tubes can also, be used, which tubes can be mutually connected, though care must naturally be taken to ensure that these are a defined distance apart and are parallel. As guide members, double-T beams or U-profiles are also possible, however.

All hollow profiles can be lined with one or more materials in order to improve rigidity and damping.

The guide member may be comprised of a metallic material, such as steel, cast iron, or extruded or molded plastics. Respectively reinforced cast mineral composite, concrete or polymer concrete can also be used, in which case the guide member, if a hollow profile, can be selectively lined with another material. Within the scope of the invention, guide member can also, however, be constructed as a solid profile.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
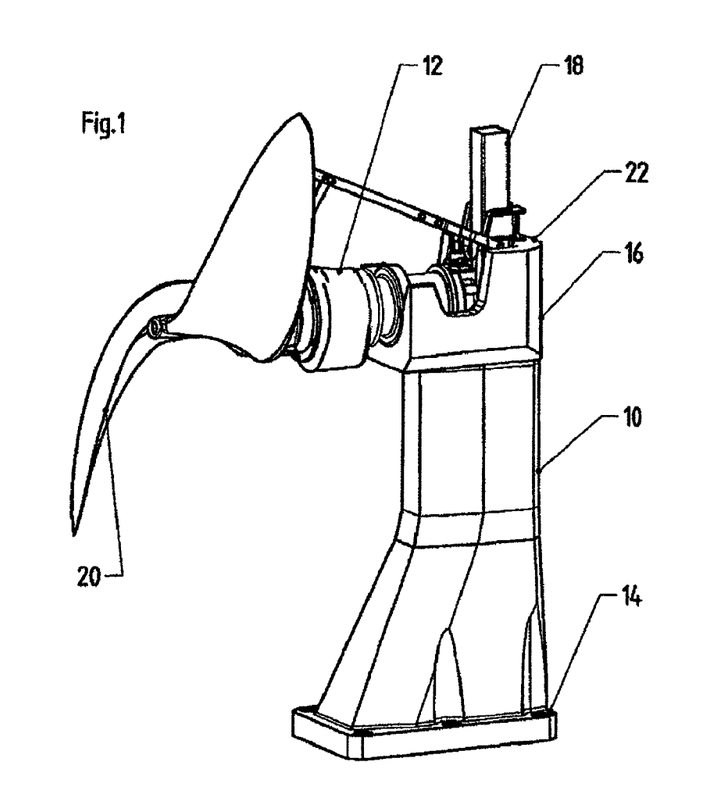
FIG. 1 is a schematic representation of a stirrer stand with a fitted motor stirrer.

FIG. 1 shows a stirrer stand 10, which in this embodiment is produced as a one-piece concrete shaped part and comprises a foot part 14 and a receiving part 16. As is made clear in FIG. 1, the contour of the receiving part 16 is configured such that it can receive a submersible motor stirrer 12, as represented here, or else, alternatively thereto, a turbine, and fixes it in its working position. The submersible motor stirrer 12 has a stirring member 20, here configured as a twin-bladed propeller. The stirrer stand 10 is overtopped by a guide member 18, which is only partially shown in FIG. 1. This guide member 18, which is here configured as a steel tube having a square cross section, serves merely for the guidance of the submersible motor stirrer 12 during vertical movements. To this end, the submersible motor stirrer 12 has on the side facing away from the stirring member 20 a sliding carriage or mounting, consisting, as far as possible, of plastic sheets, in order here to allow guidance along the guide member 18. The submersible motor stirrer can hence be lowered or lifted out over a longer distance from the rim of the basin to the receiving part of the stirrer stand. Following assembly of the submersible motor stirrer in the receiving part 16, the guide member 18 no longer fulfils any further mounting or guidance functions of the submersible motor stirrer.

Figure 2:
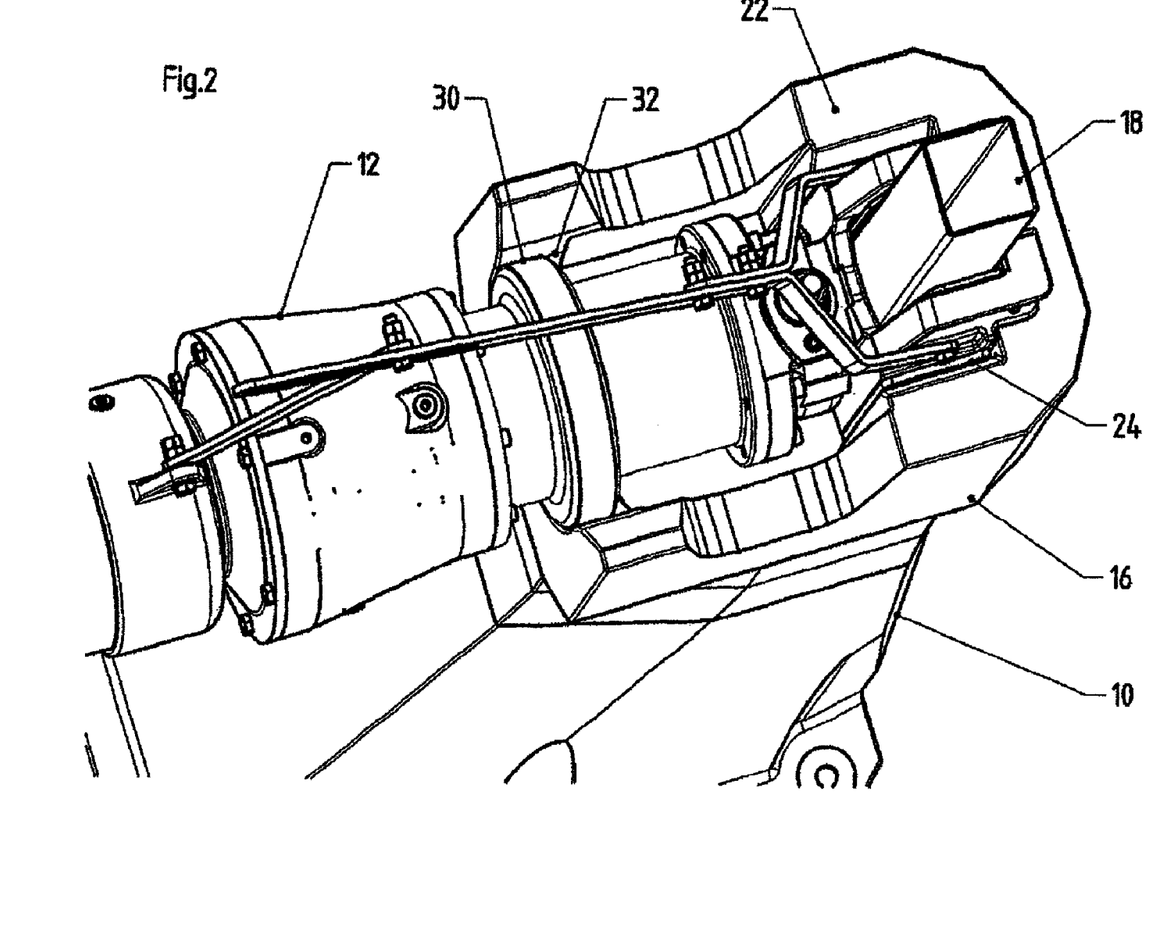
FIG. 2 is a perspective detail view of the apparatus according to FIG. 1.
Figure 3:
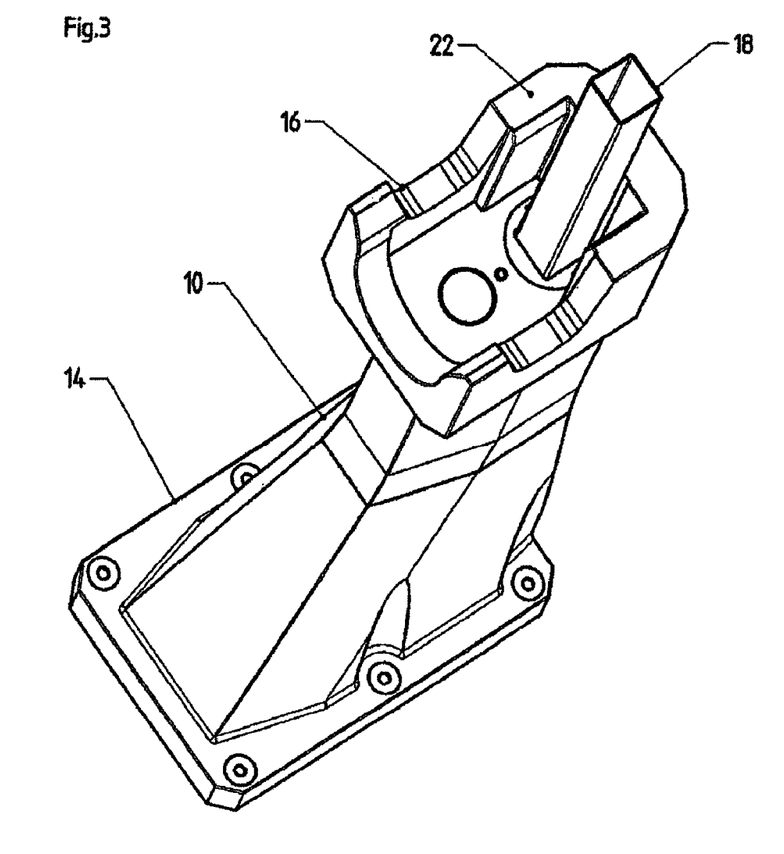
FIG. 3 is a perspective view of the stirrer stand in an oblique view from above.
Figure 6:
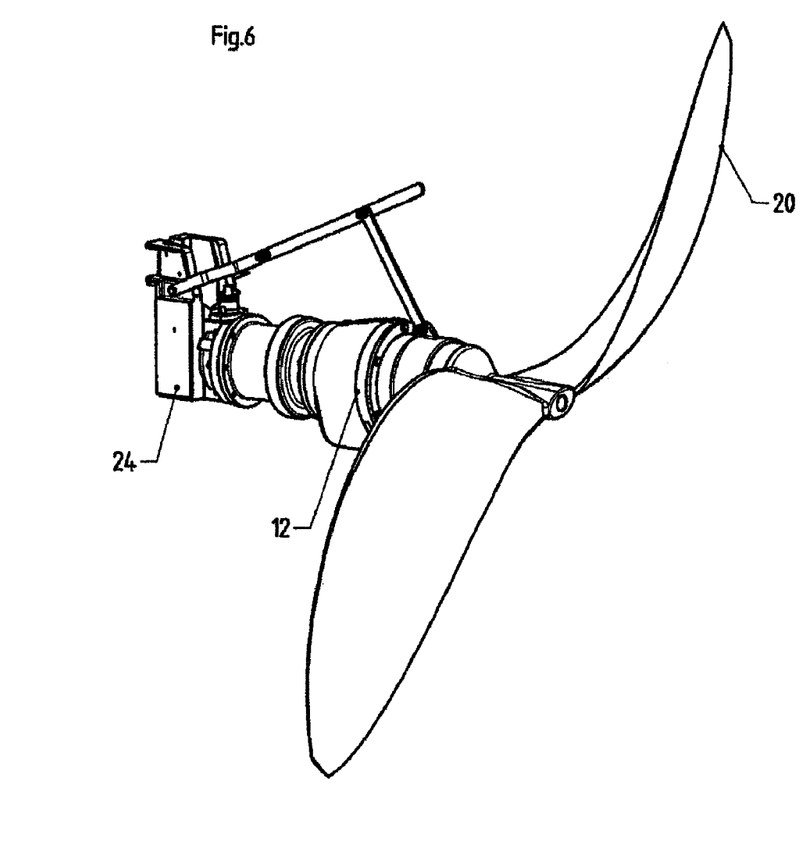
FIG. 6 is a perspective view of a submersible motor stirrer with an attached stirring member.
Figure 7:
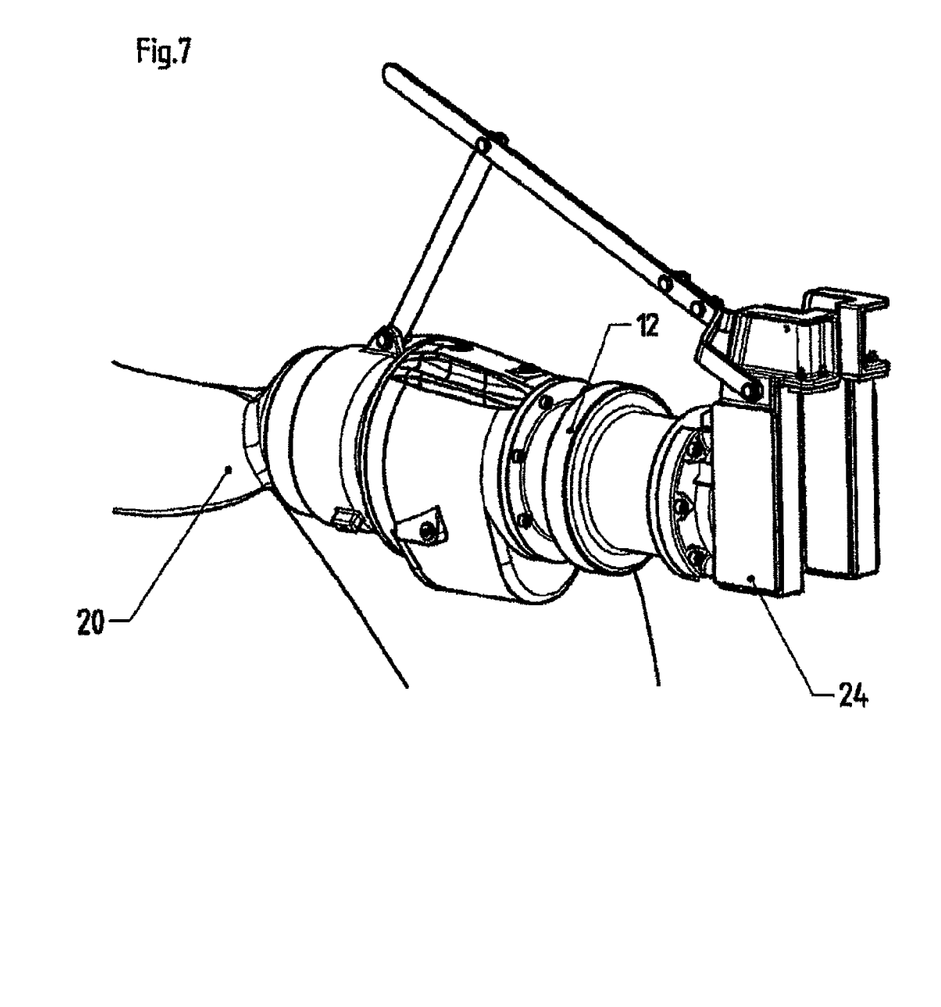
FIG. 7 is a different perspective view of the submersible motor stirrer according to FIG. 6.

That assembly state of the submersible motor stirrer 12 in the receiving part 16 which is depicted in FIG. 2 is served, first of all, by corresponding walls 22 configured in the receiving part 16 of the stirrer stand 10. Bearing directly against these walls is that respective end of the submersible motor stirrer which lies opposite the stirring member 20, the submersible motor stirrer supporting corresponding plates 24 (cf. also FIGS. 6 and 7), which bear squarely against the inner faces of the walls 22. The rear plates 24 (visible in FIG. 7) thus transmit the axial thrust and/or the reaction forces of the submersible motor stirrer to the vertical inner face of the walls 22 and from there into the stirrer stand 10. The lateral plates 24 absorb the reaction torque force of the submersible motor stirrer and transmit it to the corresponding faces of the walls 22 of the receiving part 16. The front part of the submersible motor stirrer 12 rests via a flange-like ring 30 against a corresponding annular recess 32 of the receiving part.

In the operating state, the stirrer stand 10 with the installed submersible motor stirrer 12 is arranged fully submerged in a basin (not shown here).

Figure 4:
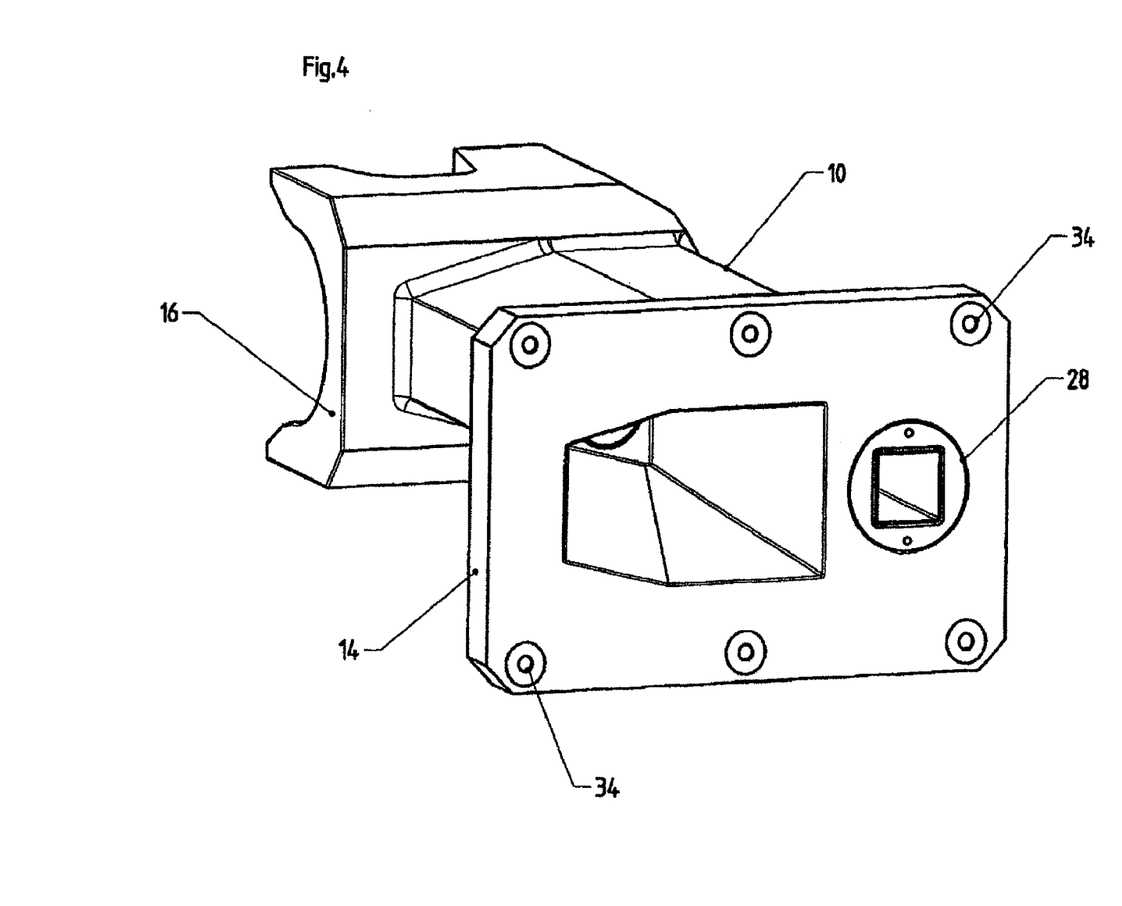
FIG. 4 is a perspective view of the stirrer stand of FIG. 3 in an oblique view from below.

The attachment to the bottom of the basin, which will probably generally be a concrete floor, is usually realized with chemical anchors (not shown in detail here). Usual examples include adhesive dowels, reaction anchors or shear connectors. Insofar as the stirrer stand is disposed in a steel container, machine screws can here be provided as anchors. In the illustration according to FIG. 4, six through holes 34 are provided for this purpose. Insofar as the basin comprises a plastic container, metallic bushings can also be used here, so that machine screws, which can be placed through the through holes 34 in the stirrer stand 10, can also be used here as anchors.

For an optimal full-faced support of the stirrer stand 10, a compensating mass, in the form of a bottom casting or cartridge, can be used on an uneven floor, consisting, for example, of concrete. These measures are already known from the prior art and are therefore not shown diagrammatically in greater detail here.

Alternatively, the stirrer stand 10 could also be positioned in a depression in the bottom of the basin and cast or glued in place there, as is realized, for example, in the field of assembly of lighting masts or overhead line masts for railways.

Figure 5:
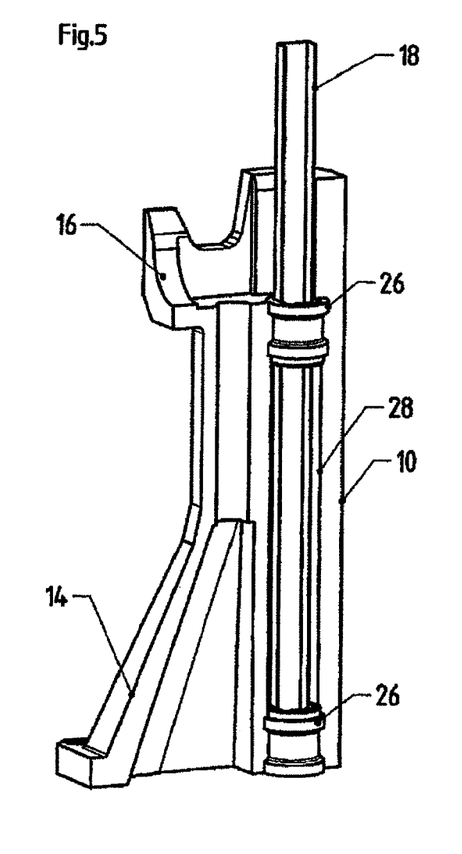
FIG. 5 is a longitudinal sectional view through a stirrer stand according to FIGS. 3 and 4.

From the representation according to FIG. 5, it can be seen that a recess 28 is provided in the stirrer stand 10 through which the guide member 18 is placed. This is advantageously fixed in the region of the bottom of the basin. The guide member can be held in the recess 28 by the two plastics bushings 26 which are comprised of a slightly elastic, pressure-resistant and vibration-damping plastic. In a manner which is not represented here, the top side of the guide member 20 projects beyond the liquid level and is either freestanding or its upper region may be fastened by a mounting to the rim of the basin, a bridge or a transverse beam.

In the embodiment which is shown here, the guide member 18 can have comparatively small dimensions, since, during operation of the submersible motor stirrer 12, it does not have to absorb any forces and moments therefrom. Instead it has a pure guidance function for positioning of the submersible motor stirrer 12 on the stirrer stand 10. The guidance member is acted upon only by forces resulting from the oncoming flow, i.e. the flow forces of the liquid contained in the basin, as well as the mechanical influences generated in connection with the ventilation of the basin content.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A stirrer stand for a submersible motor stirrer comprising a foot part and a receiving part for receiving the submersible motor stirrer, which receiving part is overtopped by a guide member serving to guide the submersible motor stirrer during assembly,
wherein
the whole of the stirrer stand, as a shaped part comprising a foot part and a receiving part, consists of a single, vibration-damping material, and
the receiving part includes a rear portion which substantially encloses a first end of the submersible motor stirrer lying opposite a stirring member and fixes the first end of the submersible motor stirrer in a working position,
further comprising at least one torque-receiving plate located between the first end of the submersible motor stirrer and an interior surface of the rear portion facing the first end.

2. The stirrer stand as claimed in claim 1, wherein the stirrer stand consists of concrete, cast mineral composite, cast iron or a composite material.

3. The stirrer stand as claimed in claim 1, wherein the contour of the receiving part is configured such that it receives a submersible motor stirrer and fixes it in its working position.

4. The stirrer stand as claimed in claim 1, wherein the receiving part has walls which absorb the reaction forces of the received submersible motor stirrer.

5. The stirrer stand as claimed in claim 3, wherein the submersible motor stirrer, on its side lying opposite a stirring member, has plates, which plates bear against corresponding inner faces of walls of the receiving part.

6. The stirrer stand as claimed in claim 1, wherein said stand is of one-piece construction.

7. The stirrer stand as claimed in claim 1, wherein said stand is of multi-part construction.

8. The stirrer stand as claimed in claim 1, wherein said stand can be attached to a bottom of the basin with suitable fasteners.

9. The stirrer stand as claimed in claim 7, wherein the fasteners comprise machine screws or chemical anchors selected from the group consisting of adhesive dowels, reaction anchors, and shear connectors.

10. The stirrer stand as claimed in claim 1, wherein said stand has a recess in which the guide member is disposed, and the guide member is fixed at one or more points in the stirrer stand by bushings disposed in said recess.

11. The stirrer stand as claimed in claim 10, wherein the bushings are comprised of a light, elastic, pressure-resistant and vibration-damping material.

12. The stirrer stand as claimed in claim 11, wherein the bushings are comprised of a synthetic resin material.

13. The stirrer stand as claimed in claim 1, wherein the guide member extends to the bottom of a basin and is fixed there.

14. The stirrer stand as claimed in claim 1, wherein the guide member is held by a positioning mechanism disposed on a rim of a basin.

15. The stirrer stand as claimed in claim 1, wherein said stand has a recess in which the guide member is disposed, and the guide member is plugged, glued or cast in this recess with as little play as possible.

16. The stirrer stand as claimed in claim 1, wherein the guide member is constructed as a hollow profile having an angular cross section.

17. The stirrer stand as claimed in claim 16, wherein the hollow profile has a square cross section.

18. The stirrer stand as claimed in claim 1, wherein the guide member is constructed of metal, extruded or molded plastic, reinforced cast mineral composite, concrete or polymer concrete.

19. The stirrer stand as claimed in claim 18, wherein the guide member is comprised of steel or cast iron.

20. The stirrer stand as claimed in claim 1, wherein the guide member is constructed as a solid profile or as a hollow profile optionally filled with another material.

* * * * *